No. 724,083. PATENTED MAR. 31, 1903.
D. L. CHANDLER.
ROLL FOR PLAITING MACHINES.
APPLICATION FILED JUNE 19, 1902.
NO MODEL.

Witnesses:
Walter P. Abell.
O. W. Pezzetti.

Inventor:
Daniel L. Chandler
by Wright, Brown & Quinby
Attys.

UNITED STATES PATENT OFFICE.

DANIEL L. CHANDLER, OF AYER, MASSACHUSETTS.

ROLL FOR PLAITING-MACHINES.

SPECIFICATION forming part of Letters Patent No. 724,083, dated March 31, 1903.

Application filed June 19, 1902. Serial No. 112,332. (No model.)

*To all whom it may concern:*

Be it known that I, DANIEL L. CHANDLER, of Ayer, in the county of Middlesex and State of Massachusetts, have invented certain new and useful Improvements in Sectional Rolls, of which the following is a specification.

This invention relates to rolls having a peripheral portion or shell composed of a series of independently-movable rings and springs interposed between the rings and the supporting shaft or arbor, whereby the different portions of the roll can accommodate themselves with a substantially even pressure to uneven surfaces.

The invention is primarily intended for use in machines for plaiting goods, and when thus used it gives a substantially even pressure on all parts of the work, though the latter be of uneven thickness in different parts; but I am not restricted to such particular use of the invention.

The invention consists in certain novel features of construction and arrangement, which I shall now proceed to describe and claim.

Figure 1:
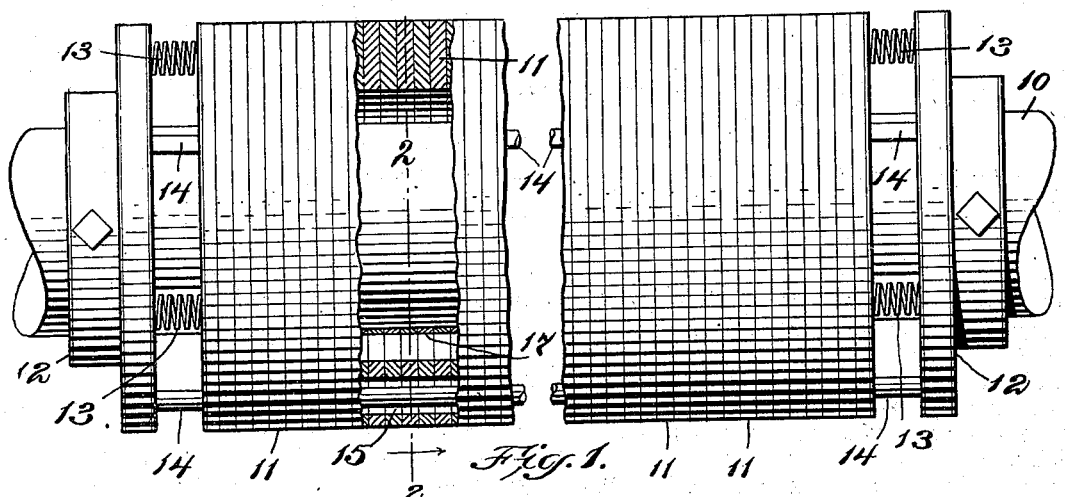
Figure 2:
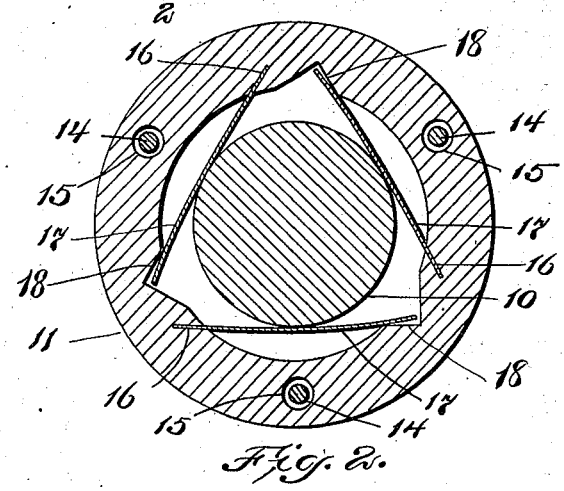
Figure 3:
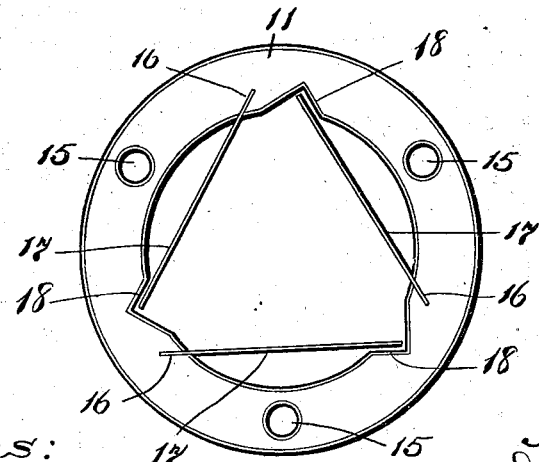

Of the accompanying drawings, Figure 1 represents a side elevation, partly in section, of a sectional roll constructed in accordance with my invention. Fig. 2 represents a section on line 2 2 of Fig. 1. Fig. 3 represents an elevation of one of the rings and springs removed from the roll.

The same reference characters indicate the same parts in all the figures.

In the drawings, 10 is the central shaft or arbor of the roll, and 11 11 are a series of independently-movable rings of equal diameter forming the shell or peripheral portion of the roll. The shell is included between two flanges 12 12, fixed to the arbor 10, and is connected with said flanges by springs 13 13, adapted to yield to permit the axial expansion and contraction of the roll under the influence of changes in temperature.

14 14 are rods extending axially of the roll and loosely occupying apertures 15 15 in the rings to prevent an extended relative rotation of the rings with respect to each other or the arbor 10.

Each ring 11 is formed with a series of saw-cuts 16 16, constituting clefts, in which are mounted one end each of a series of flat springs 17 17, tangent to the arbor 10, the other end of each spring resting upon a seat 18, formed on the ring, when the shaft is inserted between the springs. It will be seen that these springs are arranged as chords to the ring. The fixed end of each spring may be held in its saw-cut by hammering the metal of the ring to close the sides of the cut tightly against the root of the spring. The free end is adapted to slide on its seat 18 as the spring is bowed under pressure. When positioned on the shaft, the springs are tensioned to insure a playless fit, this being accomplished by leaving the free end of each spring clear of its seat by a small space before the ring is placed on the shaft, so that the circular space to which the springs are then tangent is slightly less in diameter than the shaft. Each spring is slidingly related to the shaft both axially and tangentially.

It will be apparent that the springs 17 support the rings 11 yieldingly upon the central shaft or arbor 10 and permit the several rings to yield independently in a radial direction, when pressure is exerted tending to displace them, thus rendering the roll pliable, and that by reason of the described arrangement the radial displacement of the rings is resisted with a substantially equal force from whatever direction it may take place. Each ring and its springs is a self-contained unit, and the assembly of the body of the roll consists merely in slipping any desired number of these units on the central arbor until the desired length of body has been obtained.

I claim—

1. A sectional roll comprising an arbor, a shell composed of independently-movable rings, and a series of springs fixed to each ring and arranged as chords thereof bearing on the arbor and slidable tangentially of said arbor.

2. A sectional roll comprising an arbor, a shell composed of independently-movable rings, and a series of tensioned springs fixed to each ring by one end and having the other end free and slidingly held against a seat on the ring by the presence of the arbor.

3. As an article of manufacture, a section for a pliable roll, consisting of an annulus provided with a series of springs arranged as chords thereof.

4. As an article of manufacture, a section for a pliable roll consisting of an annulus provided with a series of chord-like springs each fixed at one end and having a free end adapted to rest slidingly against a seat on the ring, said springs having a normal tendency to leave said seats.

In testimony whereof I have affixed my signature in presence of two witnesses.

DANIEL L. CHANDLER.

Witnesses:
WARREN H. ATWOOD,
KATHARINE R. MCNIFF.